US012809995B1

(12) United States Patent
Tan et al.

(10) Patent No.: US 12,809,995 B1
(45) Date of Patent: Nov. 24, 2026

(54) SYSTEM AND METHOD FOR DETECTING THREATS IN APPLICATIONS IN AN ENTERPRISE SYSTEMS

(71) Applicant: Morgan Stanley Services Group Inc., New York, NY (US)

(72) Inventors: Elysia Ziyi Tan, Singapore (SG); Raynor Xue Yang Gan, Singapore (SG)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/657,463

(22) Filed: Apr. 24, 2026

(51) Int. Cl.
*G06F 21/57* (2013.01)
*G06F 21/56* (2013.01)

(52) U.S. Cl.
CPC .......... *G06F 21/577* (2013.01); *G06F 21/566* (2013.01); *G06F 2221/033* (2013.01)

(58) Field of Classification Search
CPC . G06F 21/577; G06F 21/566; G06F 2221/033
See application file for complete search history.

(56) References Cited

U.S. PATENT DOCUMENTS 9,773,112 B1 9/2017 Rathor et al.
9,961,096 B1 5/2018 Pierce
11,777,970 B1 10/2023 Wainer
11,991,198 B1 5/2024 Kapoor et al.
2009/0100518 A1 4/2009 Overcash
2014/0047544 A1 2/2014 Jakobsson
2015/0358344 A1 12/2015 Mumcuoglu et al.
2017/0070522 A1 3/2017 Bailey et al.
2018/0165142 A1 6/2018 Harutyunyan et al.
2019/0026459 A1 1/2019 Harutyunyan et al.
2020/0065213 A1 2/2020 Poghosyan et al.
2020/0344248 A1 10/2020 De Jesus
2021/0141900 A1 5/2021 Brown et al.
2021/0160265 A1 5/2021 Chittaro
2021/0194897 A1 6/2021 Putman et al.
2022/0121741 A1 4/2022 Araujo et al.
2023/0042661 A1 2/2023 Saadon et al.
2023/0344842 A1 * 10/2023 Akhtar ................ H04L 63/1425
(Continued)

OTHER PUBLICATIONS

Berlin et al., Malicious Behavior Detection Using Windows Audit Logs, arXiv:1506.04200v2 [cs.CR] Aug. 25, 2015.
(Continued)

*Primary Examiner* — Huan V Doan
(74) *Attorney, Agent, or Firm* — PEARL COHEN LLP

(57) ABSTRACT

A method and system for application-specific threat detection in enterprise environments analyzes log data from multiple applications. Logs can be grouped by unique hash identifiers per application. Each group's behaviors can be compared to a predetermined list to generate a behavior profile. Baseline profiles, e.g., established using historical log data, can be compared with current profiles to detect behavioral changes. Differences can be evaluated against known fingerprints to assess the likelihood of malicious activity. Behavior profiles with high similarity are further grouped to improve risk assessment. Based on the likelihood of malicious behavior and/or profile similarity, a risk level can be determined, and an alert is generated if the risk surpasses a threshold.

20 Claims, 11 Drawing Sheets

(56) References Cited

U.S. PATENT DOCUMENTS

| | | | |
|---|---|---|---|
| 2023/0370490 A1 | 11/2023 | Crabtree et al. | |
| 2023/0412620 A1 | 12/2023 | Crabtree et al. | |
| 2023/0421592 A1* | 12/2023 | Parsacala | H04L 63/1425 |
| 2024/0187434 A1 | 6/2024 | Shastri et al. | |

OTHER PUBLICATIONS

Fawaz et al., Learning Process Behavioral Baselines for Anomaly Detection, 2017 IEEE downloaded from https://www.perform.illinois.edu/Papers/USAN_papers/16FAW03.pdf.

Nguyen, et al. Malware Detection Using System Logs, ICDAR Workshop '20, Oct. 26, 2020, Dublin Ireland, Proceedings published Jun. 8, 2020.

Singh et al., Dynamic behavior analysis of android applications for malware detection, International Conference on Intelligent Communication and Computational Techniques (ICCT), Manipal University Jaipur, Dec. 22-23, 2017, pp. 1-7.

* cited by examiner

210

| | |
|---|---|
| sha256 | 2d711642b726b04401627ca9fbac32f5c8530fb1903cc4db02258717921a4881 ("Hash X") |
| image_name | application_x.exe |
| parent_sha256 | NIL |
| files_created | [test.ps1] |
| dest_ports | {External: [443]} |
| registry_keys | [HKU\<SID>\SOFTWARE\Microsoft\Windows\CurrentVersion\Runonce\<application>] |
| dns_queries | [List of internal domains] |

| | |
|---|---|
| sha256 | y |
| image_name | schtasks.exe |
| parent_sha256: | |
| command_line | {x: [schtasks /create /sc <scheduletype> /tn <taskname>]} |
| files_created | NIL |
| dest_ports | NIL |
| dns_queries | NIL |

220

230

| sha256: x | | |
|---|---|---|
| Tactic | Tracked Behavior | Bit Value |
| Persistence | Create scheduled tasks | 1 |
| Command and Control | Create scripts | 1 |
| Command and Control | Create shortcut files | 0 |
| Command and Control | Create Portable Executables | 0 |
| Command and Control | Make external connections | 1 |
| Lateral Movement | Make RDP connections | 0 |
| Persistence | Interact with registry RUN keys | 1 |
| Defense Evasion | Modify security tools | 0 |
| Defense Evasion | Modify logging settings | 0 |
| Discovery | Make DNS requests for internal domains | 1 |
| Command and Control<br>Exfiltration | Make DNS requests for external domains | 0 |
| Behavioral Profile: 1 1 0 0 1 0 1 0 0 1 0 | | |

FIG. 2

310

| | | Behavior | | | | | | | | | | |
|---|---|---|---|---|---|---|---|---|---|---|---|---|
| Hash | Image Name | A | B | C | D | E | F | G | H | I | J | K |
| x | application_x.exe | 1 | 1 | 0 | 0 | 1 | 0 | 1 | 0 | 0 | 1 | 0 |
| x1 | application_x.exe | 1 | 0 | 0 | 0 | 1 | 0 | 1 | 0 | 0 | 1 | 0 |
| x2 | application_x.exe | 1 | 1 | 1 | 0 | 1 | 0 | 1 | 0 | 0 | 1 | 0 |
| y | application_y.exe | 0 | 0 | 0 | 0 | 0 | 1 | 1 | 0 | 1 | 1 | 0 |
| z | application_y.exe | 1 | 1 | 1 | 1 | 1 | 0 | 0 | 1 | 0 | 0 | 1 |

320

| Hash | x | x1 | x2 | y | z |
|---|---|---|---|---|---|
| x | | 0.8 | 0.83 | 0.14 | 0.33 |
| x1 | 0.8 | | 0.67 | 0.33 | 0.22 |
| x2 | 0.83 | 0.67 | | 0.25 | 0.44 |
| y | 0.14 | 0.33 | 0.25 | | 0 |
| z | 0.33 | 0.22 | 0.44 | 0 | |

FIG. 3

410

| sha256: x | | | | | | | | | | | |
|---|---|---|---|---|---|---|---|---|---|---|---|
| Behavior | A | B | C | D | E | F | G | H | I | J | K |
| Day 1 | 1 | 1 | 0 | 0 | 1 | 0 | 1 | 0 | 0 | 1 | 0 |
| Day 2 | 1 | 0 | 0 | 0 | 0 | 0 | 1 | 0 | 0 | 1 | 0 |
| Day 3 | 0 | 1 | 1 | 0 | 1 | 0 | 0 | 0 | 0 | 1 | 0 |
| Day 4 | 1 | 0 | 0 | 1 | 1 | 0 | 1 | 0 | 0 | 1 | 0 |
| Day 5 | 0 | 1 | 1 | 0 | 1 | 0 | 1 | 1 | 0 | 1 | 0 |
| Day 6 | 1 | 1 | 0 | 0 | 1 | 1 | 1 | 0 | 0 | 1 | 0 |
| Day 7 | 1 | 1 | 0 | 0 | 1 | 1 | 1 | 0 | 0 | 1 | 0 |
| Baseline | 1 | 1 | 0 | 0 | 1 | 0 | 1 | 0 | 0 | 1 | 0 |

FIG. 4

| sha256: x | | | | | | | | | | | |
|---|---|---|---|---|---|---|---|---|---|---|---|
| Behavior | A | B | C | D | E | F | G | H | I | J | K |
| Profile | 1 | 1 | 0 | 0 | 1 | 0 | 1 | 0 | 0 | 1 | 0 |
| Baseline | 1 | 1 | 0 | 0 | 1 | 0 | 1 | 0 | 0 | 1 | 0 |
| Difference | 0 | 0 | 0 | 0 | 0 | 0 | 0 | 0 | 0 | 0 | 0 |

510a
515a
520a
525a

FIG. 5A

| sha256: y | | | | | | | | | | | |
|---|---|---|---|---|---|---|---|---|---|---|---|
| Behavior | A | B | C | D | E | F | G | H | I | J | K |
| Profile | 1 | 0 | 1 | 0 | 1 | 1 | 1 | 0 | 0 | 1 | 1 |
| Baseline | 0 | 0 | 0 | 0 | 0 | 1 | 1 | 0 | 1 | 1 | 0 |
| Difference | 1 | 0 | 1 | 0 | 1 | 0 | 0 | 0 | 0 | 0 | 1 |

510b
515b
520b
525b

FIG. 5B

| | sha256: y | | | | | | | | | | | |
|---|---|---|---|---|---|---|---|---|---|---|---|---|
| | Behavior | A | B | C | D | E | F | G | H | I | J | K |
| 610 | Difference | 1 | | 1 | | 1 | | | | | | 1 |
| 620 | Fingerprint 1 | 1 | | | | 1 | | | | | | 1 |
| 630 | Fingerprint 2 | | | 1 | | | | | 1 | 1 | | |
| 640 | Fingerprint 3 | | 1 | | | 1 | | | | 1 | | 1 |

FIG. 6

SYSTEM AND METHOD FOR DETECTING THREATS IN APPLICATIONS IN AN ENTERPRISE SYSTEMS

TECHNICAL FIELD OF THE INVENTION

The invention relates to automatic analysis of applications for security risk run on an enterprise system. In particular, automatically identifying security threats in executables.

BACKGROUND OF THE INVENTION

Many current organizations run large computing systems. These systems (e.g., enterprise systems) can include a large volume of applications, those applications (e.g., software users are running) can include many executables. For example, a given application can have thousands of executables, differentiated by their unique file hash values, in a system having thousands of computing devices.

Applications and/or their corresponding executables can be compromised (e.g., contaminated by a bad actor at source, subject to a cyberattack) or abused (e.g. coerced to execute a bad command or a bad file in proxy). Currently, malware authors continue to find ways to blend in with normal traffic such that even legitimate executables can pose a serious security threat. However, for organizations to do business, the use of executables can be highly important.

Currently manual efforts are used to analyze applications and their corresponding executables. However, it can be impossible (or nearly impossible) to manually deep dive into all executables running in an environment and/or constantly monitor all of them daily. Therefore, it can be desirable to perform automatic analysis of executables to increase accuracy of malware detection.

SUMMARY OF THE INVENTION

In one aspect, the invention a method for threat detection on an application by application basis in an enterprise system having a plurality of applications. The method can involve receiving, by a processor, a plurality of logs, wherein each of the plurality of logs has log data from the plurality of applications and each of the plurality of applications has a unique hash identifier. The method can involve creating, by the processor, a first set of groups of the plurality of logs, wherein each first set of groups has a corresponding unique hash identifier, wherein each first set of groups contains all logged behaviors for the particular respective application of the plurality of applications having the respective unique hash identifier.

The method can involve for each group in the first set of groups, comparing, by the processor, all logged behaviors in each group to a predetermined list of possible behaviors to create a comprehensive possible behavior list for each group. The method can involve for each group in the first set of groups, determining, by the processor, a behavior profile for each group based on the respective behavior list for the group and the respective log data.

The method can involve determining, by the processor, a baseline behavior profile for each group in the first set of groups based on n prior days of logs that correspond to the respective group in the first set of groups, where n is non-zero positive integer. The method can involve comparing, by the processor, each behavior in each behavior profile for each group in the first set of groups that are current to each baseline behavior profile having the same unique hash identifier to identify behaviors that have differences from the baselines.

The method can involve for each group in the first set of groups that is current having differences for behaviors, comparing, by the processor, the differences observed for each respective group against one or more known fingerprints to determine that the respective group has a likelihood of being malicious. The method can involve for each group in the first set of groups, creating, by the processor, a second set of groups, wherein each group in the second set of groups includes all behavior profile pairs of a respective group of the first set of groups that have a similarity above a similarity threshold.

The method can involve determining, by the processor, a risk level for each group in the first set of groups that is current based on its respective likelihood of being malicious and a corresponding group in the second set of groups. The method can involve for each group with a risk level above a threshold, transmitting, by the processor, an alert.

In some embodiments, each behavior profile is a binary vector. In some embodiments, the predetermined list of possible behaviors is updated in real-time. In some embodiments, the similarity is determined by using a Jaccard Index on all unique pairs of the behavior profiles. In some embodiments, each baseline behavior profile is based on historical data n number of prior days, where n is any non-zero integer.

In some embodiments, each baseline behavior profile is based on a most prevalent bit that appears more than fifty percent of the time for each particular behavior in the profile over the n number of prior days. In some embodiments, n is a rolling window. In some embodiments, the historical data is updated daily.

In some embodiments, a behavior profile for a group is current if it was created in a prior twenty four hours. In some embodiments, generating the behavior profile further comprises inferring data from the respective logs.

In another aspect, the invention includes a system for threat detection on an application by application basis in an enterprise system. The system can include plurality of applications. The system can include a processor coupled to the plurality of applications, the processor can be configured to receive a plurality of logs, wherein each of the plurality of logs has log data from the plurality of applications and each of the plurality of applications has a unique hash identifier. The processor can be configured to create a first set of groups of the plurality of logs, wherein each first set of groups has a corresponding unique hash identifier, wherein each first set of groups contains all logged behaviors for the particular respective application of the plurality of applications having the respective unique hash identifier.

The processor can be configured to for each group in the first set of groups, compare all logged behaviors in each group to a predetermined list of possible behaviors to create a comprehensive possible behavior list for each group. The processor can be configured to for each group in the first set of groups, determine a behavior profile for each group based on the respective behavior list for the group and the respective log data. The processor can be configured to determine a baseline behavior profile for each group in the first set of groups based on n prior days of logs that correspond to the respective group in the first set of groups, where n is non-zero positive integer.

The processor can be configured to compare each behavior in each behavior profile for each group in the first set of groups that are current to each baseline behavior profile having the same unique hash identifier to identify behaviors that have differences from the baselines. The processor can be configured to for each group in the first set of groups that is current having differences for behaviors, compare the differences observed for each respective group against one or more known fingerprints to determine that the respective group has a likelihood of being malicious. The processor can be configured to for each group in the first set of groups, create a second set of groups, wherein each group in the second set of groups includes all behavior profile pairs of a respective group of the first set of groups that have a similarity above a similarity threshold. The processor can be configured to determine a risk level for each group in the first set of groups that is current based on its respective likelihood of being malicious and a corresponding group in the second set of groups. The processor can be configured to for each group with a risk level above a threshold, transmitting an alert.

In some embodiments, each behavior profile is a binary vector. In some embodiments, the predetermined list of possible behaviors is updated in real-time. In some embodiments, the similarity is determined by using a Jaccard Index on all unique pairs of the behavior profiles.

In some embodiments, each baseline behavior profile is based on historical data n number of prior days, where n is any non-zero integer. In some embodiments, each baseline behavior profile is based on a most prevalent bit that appears more than fifty percent of the time for each particular behavior in the profile over the n number of prior days.

In some embodiments, n is a rolling window. In some embodiments, the historical data is updated daily. In some embodiments, a behavior profile for a group is current if it was created in a prior twenty four hours. In some embodiments, generating the behavior profile further comprises inferring data from the respective logs.

These, additional, and/or other aspects and/or advantages of the present invention may be set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 shows the example of aggregation of behaviors for hash x, and an example of aggregation of behaviors for schtasks.exe, shown as hash y, according to some embodiments.

FIG. 3 shows three different applications, according to some embodiments.

FIG. 4 shows a table showing a seven day time window for behavior profiles for hash x, according to some embodiments.

FIG. 5A shows a hash:x having behaviors A through K, a current behavior profile and a baseline behavior profile, according to some embodiments.

FIG. 5B shows a hash:y having differences for behaviors A, C, E and K, according to some embodiments.

FIG. 6 shows for hash:y having current behavior difference compared against fingerprint 1, fingerprint 2, and fingerprint 3, according to some embodiments.

Figure 1A:
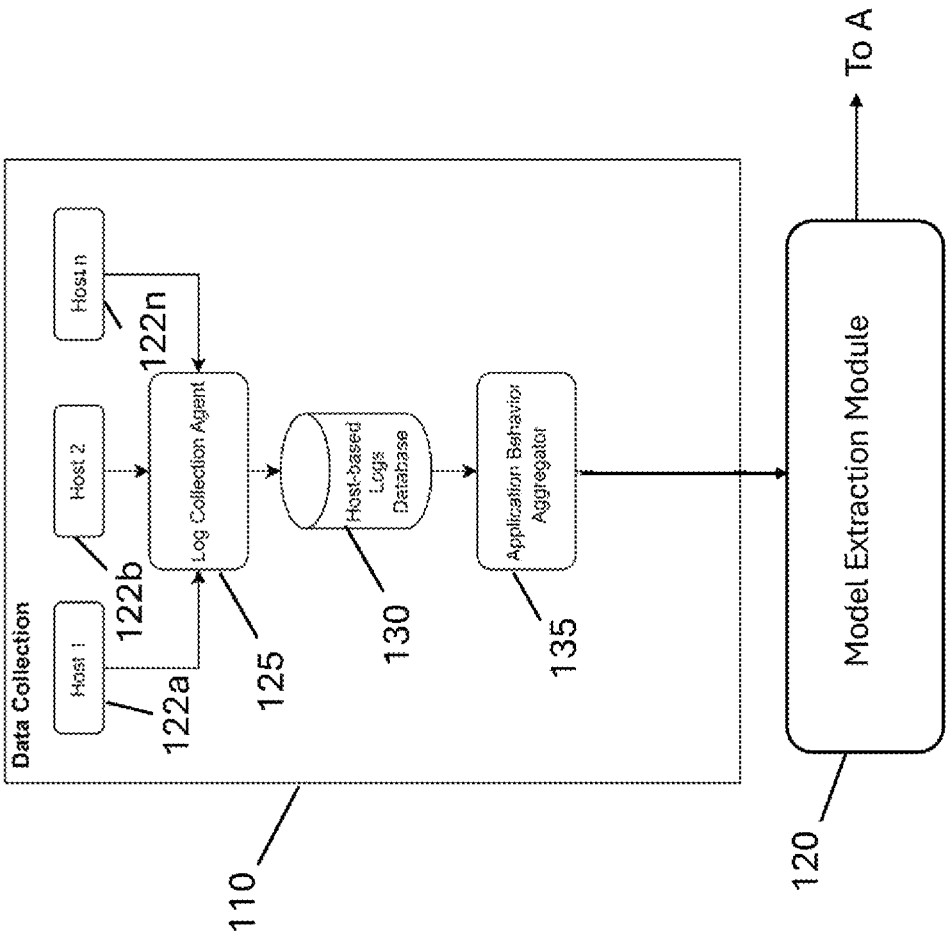
FIGS. 1A through 1C shows a high-level block diagram of a system architecture for threat detection on an executable by executable basis in an enterprise system, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

Figure 1B:
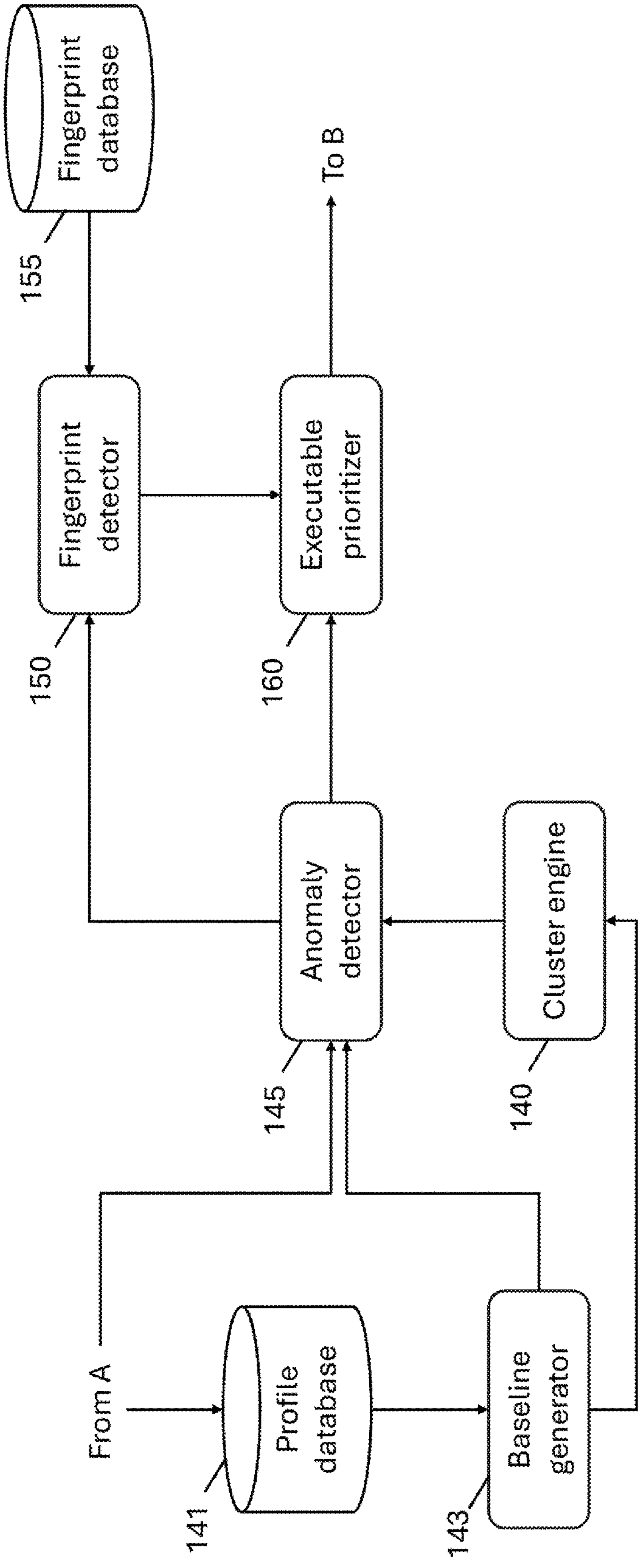
Figure 1C:
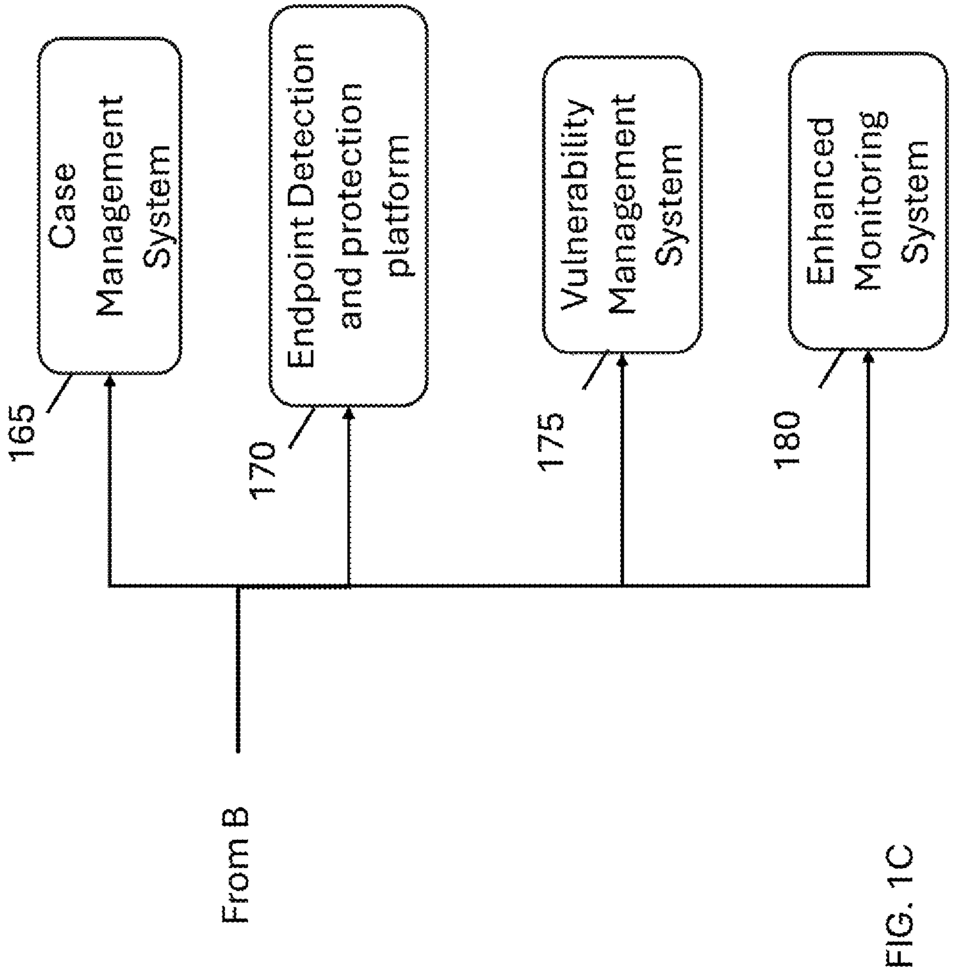

FIGS. 1A through 1C shows a high-level block diagram of a system architecture for threat detection on an executable by executable basis in an enterprise system, according to some embodiments.

FIG. 1A shows a portion of the system architecture, according to some embodiments. The system architecture includes a data collection module 110, and a model extraction module 120.

The data collection module 110 can include a log collection agent 125, a host-based logs database 130, and an application behavior aggregator 135.

The log collection agent 125 can be coupled to a plurality of hosts, 122*a*, 122*b*, . . . 122*n*, generally hosts 122 and host-based logs database 130. For example, when an application's executable runs on one of the hosts 122 or another computing device in communication with the hosts 122, data can be logged. The data to be logged can be transmitted to the log collection agent 125 (e.g., by the hosts 122 automatically transmitting the data or one or more internal logs to the log collection agent 125, the log collection agent 125 requesting the log data from the hosts 122, or any combination thereof). The log data can be collected and/or requested every hour, every half hour, and/or at any interval as is input by user. The log collection agent 125 can transmit the log data to the host-based logs database 130.

The host-based logs database 130 can store the log data. The host-based logs database 130 can be coupled to the application behavior aggregator 135.

The application behavior aggregator 135 can aggregate behavioral information stored in the host-based logs database 130 on a per hash basis. Each application can have many unique file hashes (e.g., a hash determined as is known in the art). The hashes can be based on binary contents of the executable using SHA256 cryptographic hash function. Each executable can have instances that vary from host to host. For example, an executable having a particular file hash (e.g., hash #1) can have a first instance running on host 122A and a second instance operating on host 122B. Even though the first and second instances are for the same executable they can be different enough such that some different behaviors are produced by the first instance and second instance. For example, the first instance can be on computer type A that allows one or more different behaviors than computer type B where the second instance is running. Thus, aggregating behavior information on a per file hash basis can ensure that all behaviors (or substantially all behaviors) for each particular executable are associated with the particular executable (e.g., creating a first set of groups, one group for each unique file hash).

Aggregating behavior information on a per file hash basis can also reduce the number of logs that need to be operated on. For example, assuming billions of logs for all executables on an enterprise level for all applications, creating one entry having all behaviors for each executable can reduce tens of billions of logs to, for example, millions.

Aggregating behavior information on a per file hash basis can also allow tracking at a more granular level. For example, malicious changes that have been made to a specific version of the application can be tracked individually, thus avoiding having the change taint the behavior observed for the application as a whole. Functionality differences between the different versions of the same application can also be tracked individually, allowing for more accurate identification of behavioral differences.

Assume four logs created by the same executable on two different hosts, as shown below in Tables 1A, 1B, 1C and 1D.

TABLE 1A

| | |
|---|---|
| Sha256 Hash | 2d711642b726b04401627ca9fbac32f5-c8530fb1903cc4db02258717921a4881 ("Hash X") |
| Application Name | application_x.exe |
| Hostname | ComputerA |
| Event ID | 11 |
| Target Filename | test.ps1 |

TABLE 1B

| | |
|---|---|
| Sha256 | 2d711642b726b04401627ca9fbac32f5-c8530fb1903cc4db02258717921a4881 ("Hash X") |
| Application Name | application_x.exe |
| Hostname | ComputerA |
| Event ID | 13 |
| Target Object | HKU\<SID/SOFTWARE\Microsoft\CurrentVersion\Runonce\<application> |

TABLE 1C

| | |
|---|---|
| TABLE 1BSha256 | 2d711642b726b04401627ca9fbac32f5-c8530fb1903cc4db02258717921a4881 ("Hash X") |
| Application Name | application_x.exe |
| Hostname | 2 |
| Event ID | 3 |
| Destination Port | 443 |
| Destination IP | 117.192.224.206 |

TABLE 1D

| | |
|---|---|
| Sha256 | 2d711642b726b04401627ca9fbac32f5-c8530fb1903cc4db02258717921a4881 ("Hash X") |
| Application Name | application_x.exe |
| Hostname | 2 |
| Event ID | 22 |
| Windows Query Name | internal_domain.com |

Table 2 shows an example of the behavior aggregated by hash:

TABLE 2

| | | |
|---|---|---|
| Metadata | Sha256 | 2d711642b726b04401627ca9fbac32f5-c8530fb1903cc4db02258717921a4881 ("Hash X") |
| | Application Name | application_x.exe |
| | Parent_sha256 | NIL |
| Behavior | Files_created | [test.ps1] |
| | Dest_ports | {External: [443]} |
| | Registry_keys | [HKU\<SID/SOFTWARE\Microsoft\CurrentVersion\Runonce\<application>] |
| | Dns_queries | [list of internal domains] |
| | | . . . |

As shown in Table 2, the example logs of Table 1A, 1B, 1C and 1D are aggregated such that for application "application_x.exe", having an executable with a sha256 file hash ("2d711642b726b04401627ca9fbac32f5c8530fbl90 3cc4db02258717921a4881" or "Hash X"), has behaviors of (1) creating a file named test.psl and (2) interacting with the Runonce registry keys, from the execution of the executable on ComputerA, as well as, (3) making external calls to destination port [443] and (4) DNS requests to internal domains from the execution of the executable on host 2.

As is apparent to one of ordinary skill in the art, the example logs and aggregation by file hash are examples only and that a number of fields, amount of input data and resultant aggregation by hash are typically much larger and include many more behaviors/fields, as is dependent upon the applications, executables and size of the enterprise system.

The behaviors aggregated by hash can be input to model extraction module 120. The model extraction module 120 can create a behavior profile for each executable having its behaviors aggregated by hash based on a group of behaviors known to be potentially malicious (e.g., as input by a user). Potentially malicious behavior can include behavior that may indicate that one or more of the executables, or applications, have been subject to a cyberattack.

Each behavior profile can be represented by a bit vector that indicates whether one or more behaviors that are indicated as potentially malicious exist for the respective executable. For example, assume that there are two behaviors, behavior 1 ("BH1") and behavior 2 ("BH2") that have been indicated as potentially malicious behaviors, and three executables. In this example, the behaviors of each of the three executables can be examined to contain BH1 and/or BH2 to create the behavior profile for each of the three executables by switching on the corresponding bit. The behavior profile can be a bit-based representation of existence of the potentially malicious behaviors in each executable (e.g., 0 for a tracked behavior that doesn't exist in the aggregationby hash and 1 for a behavior that does exist in the aggregationby hash).

The one or more behaviors that are potentially malicious can be input by a user. The one or more behaviors that are potentially malicious can be based on known potentially malicious behavior frameworks (e.g., MITRE framework). Table 3 shows an example of one or more behaviors that are potentially malicious (e.g., behaviors to be tracked), along with 1's and 0's to indicate a behavior profile of an example hash:

TABLE 3

| Adversary Tactical Goal | Behavior (e.g., tracked behavior) | Behavior Bit Vector, BBV |
|---|---|---|
| Persistence | Create Scheduled Tasks | 1 |
| Command and Control | Create Scripts | 1 |
| Command and Control | Create shortcut files | 0 |
| Command and Control | Create portable executables | 0 |
| Command and Control | Make external connections | 1 |
| Lateral Movement | Make RDP connections | 0 |
| Persistence | Interact with registry RUN keys | 1 |
| Defense Evasion | Modify security tools | 0 |
| Defense Evasion | Modify logging settings | 0 |
| Discovery | Make DNS requests for internal domains | 1 |
| Command and Control Exfiltration | Make DNS requests for external domains. | 0 |

In this example shown in Table 3, the behavior profile represented by a Behavior Bit Vector BBV representing the presence of tracked behaviors can be: [1 1 0 0 1 0 1 0 0 1 0].

In some embodiments, the model extraction module 120 can review the data as generated by the application behavior aggregator 135 (e.g., aggregated behavioral information as computed by the application behavior aggregator 135) to determine additional behaviors to consider for inclusion in the behavior profile. For example, it may be desirable to extract additional information from the logs available for each hash. For example, it can be desired to determine whether an executable creates a scheduled task and with some systems (e.g., Sysmon) the execution of the executable and the execution of schtasks.exe results in two separate log events. In this example, to determine whether the executable generates scheduled tasks, the previously mentioned two events can be linked together.

In another example, assume studying registry keys, there is only a subset of registry keys of interest, for example, registry keys related to persistence capabilities, however, in some systems (e.g., with Sysmon), registry key interactions can be all lumped under Event IDs 12 and 13. As such, the system can extract only information of interest.

For example, assume file hash, Hash X as shown above in Table 2. It may be desirable to know whether the behavior of a scheduled task happened or not, and if it did the behaviors of that scheduled task can be linked to the behaviors of hash x, as scheduled tasks are often used by malware for persistence. Turning to FIG. 2, FIG. 2 shows the example of aggregation of behaviors for hash x from 210, and an example of aggregation of behaviors for schtasks.exe, shown as hash y 220, according to some embodiments. In this example, the behaviors from hash x 210 and the parent of hash y 220 are included in creating the behavior profile for hash x 230 which is based on example tracked behaviors as shown.

Turning back to FIG. 1A, in some embodiments, the model extraction module 120 adds additional behaviors for tracking without impacting the usability of existing data. For example, if new behaviors for tracking are added, the number of bits in a behavior profile for a hash created before the added tracked behaviors is different than the number of bits in a behavior profile for the same hash created after the added tracked behaviors. In these embodiments, the system can refrain from using new behaviors in baseline computations (e.g., determined as described below with respect to FIG. 4) until after a duration has passed. The duration can be a size of the rolling window divided by 2 (e.g., 1 week, 2 weeks, or any value as input by user). In some embodiments, a metadata file can be created for each tracked behavior. The metadata can include descriptor, date added, classification, severity and/or data sources. Table 4 is an example of a metadata file for a tracked behavior:

TABLE 4

| Tracked behavior | Create scheduled tasks |
|---|---|
| Description | Adversaries often use scheduled tasks as a means to achieve persistence on victim machines |
| Date Added | 8 Aug. 2025 |
| Attack type | Persistence |
| Severity | High |
| Data sources | Windows Sysmon Event ID 1<br>Windows Sysmon Event ID 12/13<br>Widows Security Event ID 4698 |

Turning to FIG. 1B, the behavior profiles as output from the model extraction module 120 can be input to a profile database 141 and an anomaly detector 145. The behavior profiles can be stored in the profile database 141. The number of days worth of data stored can be greater than or equal to the size of the rolling window. The behavior profiles can be used by a baseline generator 143. The baseline generator 143 can generate baseline profiles. The cluster engine 140 can use the baseline behavior profiles to identify applications that are related but not necessarily identical to each other such that they have similar behavior profiles, to create families of behavior profiles, or in other words, families of executables. For example, a version 1.0 of an application and version 1.1 of an application may generate different behavior profiles but be identical or substantially similar in functionality. The cluster engine 140 can create families of executables.

The cluster engine 140 can group behavior profiles into families of executables based on a similarity between behavior profiles. Behavior profiles that have a similarity above a threshold can be included in the same family.

The similarity can be determined based on a Jaccard Index determined between all pairs of behavior profiles, as shown below in EQN. 1:

$$J(A, B) = \frac{No.\ \text{of } 1s \text{ in both vectors}}{No.\ \text{of } 1s \text{ in both vectors} + No.\ \text{of mismatches}} \quad \text{EQN. 1}$$

where J(A,B) ranges from 0 to 1 and the closer to 1 the more similar the behavior profiles. The behavior profiles are then clustered based on a set threshold. For example, behavior profile pairs having a similarity above a threshold can be clustered.

Turning to FIG. 3 shows an example of three different applications, according to some embodiments. In FIG. 3, x, x1 and x2 are different versions of the same application, y is an application, and z an application. The behavior table 310 shows baseline behavior profiles for x, x1, x2, y and z. The hash table 320 shows the Jaccuard Index as determined via EQN. 1 above. Assuming a threshold value set of 0.65, only x, x1, and x2 are clustered into a group.

In this manner, by grouping executables based on how they act (e.g., behaviors) rather than how they look (e.g., identifier) better accuracy of anomalous behavior can be detected.

For example, given that a hash of an executable can be computed based on its binary contents, different versions of the same application can have different hashes. Even though they belong to the same family and are expected to have similar functionality, different versions may never be grouped together if association is done based on hash. For example, if grouping is done based on hash, different versions of the same application (e.g., x, x1 and x2 as described above) may never be grouped together even though they are different versions of the same application and are expected to have functionality that substantially overlaps with each other.

In another example, grouping based on image names of executables can cause a lack of accuracy. Image names can easily be changed by the user, such that unrelated executables can have the same image name and thus be grouped together even though they exhibit very different behaviors when executed. Grouping such executables together can therefore distort behavioral comparisons and negatively impact similarity scores when evaluating behavior profiles. For example, if grouping is done based on image names, different applications (E.g. y and z as described above) will be grouped together even though they are different applications with different functionalities.

Accordingly, grouping executables based on how they act (e.g., behaviors) rather than how they look (e.g., identifiers) can improve accuracy.

Turning back to FIG. 1B, the baseline generator module 143 can review the behavior profile for each hash over a time window (e.g., every day, every other day, or every three days, or any time interval that is input by a user) to determine a baseline behavior profile for the hash. The baseline behavior profile can be based on a most prevalent bit for each behavior over the time window. The most prevalent bit can be a bit that appears more than fifty percent of the time during the time window. For example, turning to FIG. 4, FIG. 4 shows an example table 410 showing a seven day time window for behavior profiles for hash x, according to some embodiments. As shown, the behavior profile for the same hash is different on different days. The baseline hash is determined by selecting the most prominent bit for each behavior. For example, for behavior A there are five "1" bits and two "0" bits, thus the baseline for behavior A is "1". In this manner the baseline behavior profile for each hash can be determined, and/or anomalies in the behavior profile can be accounted for (e.g., picking the prominent bit ensures that more likely than not anomalies are left out).

In some embodiments, the number of days in the window is odd, e.g., with at least 3 days. In some embodiments, the number of days in the window is any number of days that is input by a user. In some embodiments, if the number of days in the window is even and there is an even number of "1" and "0" then the baseline value is selected at random.

The baseline behavior profile can be determined on a rolling basis with a rolling time window. For example, on day 8, the window can be days 1-7, on day 9 the window can be days 2-8, on day 10 the window can be days 3-9, and so forth.

In some embodiments, one or more days' worth of data may be missing (e.g., day 4 there is no data or day 2 and 4 there is no data). In these embodiments, the prior days beyond the window can be used until there is a minimum number of days in the window. In some embodiments, the minimum number of days with data is greater than or equal to the size of the time window divided by 2.

The anomaly detection module 145 can also determine similarities and/or differences of the current behavior profile. The level of similarity can be indicated as a similarity score between a current behavior profile (e.g., current day's behavior profile) and a baseline profile and in view of the baseline behavior profiles belonging to the executables in the family the executable belongs too. The similarity score can be based on a behavior profile similarity of a current behavior profile of the hash with the baseline behavior profile of the hash, and/or similarity of the current behavior profile within a family of behavior profiles (e.g., family as determined by the clustering module). A higher similarity can indicate there is little difference between the current day's behavior profile and the baseline profile and the family, in other words, the risk level of malicious behavior is lower. A lower similarity can indicate more likely that something malicious has occurred. The behavior profile similarity of a current behavior profile of the hash with the baseline behavior profile can be determined based on a Jacquard Index as shown below in EQN. 2:

$$\text{Similarity with baseline} = J(A, B_{baseline}) \quad \text{EQN. 2}$$

where A is the current behavior profile and $B_{baseline}$ is the baseline behavior profile. The similarity within a family that the current executable belongs to can be determined as shown below in EQN. 3:

$$\text{Similarity within family} = \frac{J(A, B_1) + J(A, B_2) + \ldots + J(A, B_n)}{n} \quad \text{EQN. 3}$$

where A is the current behavior profile, $B_1$ is a first baseline behavior profile of the family, $B_2$ is a second baseline behavior profile of the family, and $B_n$ is a $n^{th}$ baseline behavior profile of the family, where n is a positive integer.

The similarity score (e.g., final similarity score) can be based on the similarity between the current behavior profile and the baseline behavior profile and the similarity between the family and the current behavior profile. The final similarity score can be as shown below in EQN. 4:

$$\text{Similarity Score} = \text{Similarity within family} + \text{Similarity with baseline} \quad \text{EQN. 4}$$

where Similarity within family can be as determined above in EQN. 3, and Similarity with baseline can be as determined above in EQN. 2.

Differences can be determined as shown in FIGS. 5A and 5B. For example, FIG. 5A shows an example of a hash:x having behaviors 510 A through K, a current behavior profile 515 and a baseline behavior profile 520, according to some embodiments. As shown in hash:x differences 525, there are no differences between the current behavior profile 515 and the baseline behavior profile 520. FIG. 5B shows an example of hash:y having differences for behaviors A, C, E and K, according to some embodiments. Differences can indicate a difference between the current behavior profile and the baseline behavior profile.

Turning back to FIG. 1B, a fingerprint detector module 150 can receive differences from the anomaly detector 145, e.g., as shown in FIGS. 5A and 5B. The fingerprint detector module 150 can compare the differences against a list of known suspicious fingerprints (e.g., as input by a user) as stored in a fingerprint database 155. Each fingerprint in the fingerprint database 155 can be a combination of behaviors which when displayed together may signify malicious behavior. For example, if an executable is suddenly seen connecting to external IPs, encoding data and creating scheduled tasks, it could suggest that the executable has been compromised and is encoding data for exfiltration to a C2 server and perhaps creating a scheduled task for persistent exfiltration.

A fingerprint affinity score can be determined based on a current behavior profile's differences compared against the fingerprints database. The fingerprint affinity score can be determined as shown below in EQN. 5:

$$\text{fingerprint affinity score} = \frac{No.\text{ of matches}}{\text{Total } no.\text{ of fingerprints}} \qquad \text{EQN. 5}$$

where the No. of matches is the number of matches between a current behavior profile's difference and the fingerprints, and the Total no. of fingerprints is the total number of fingerprints the comparison is made against (e.g., all or a subset of the fingerprints in the fingerprint database 155). Turning to FIG. 6, FIG. 6 shows for hash:y having current behavior difference 610 compared against fingerprint 1 620, fingerprint 2 630, and fingerprint 3 640, according to some embodiments. The current behavior profile's differences 610 is a match with only fingerprint 1. A match can occur when behaviors present in the fingerprint are a subset of the behaviors present in the identified differences. Thus, in this example, applying EQN. 5, the fingerprint affinity score is ⅓, or 0.33.

Turning back to FIG. 1B, in various embodiments, the fingerprints are input by a user into the fingerprint database 155.

The output of the anomaly detector 145 and the fingerprint detector 150 can be input to the executable prioritizer module 160. The executable prioritizer module 160 can determine a final risk score for each hash (e.g., each executable), and provide a ranked list of executables in order of risk level based on the final risk score. The final risk score can be determined as shown below in EQN. 6:

$$\text{Final Risk Score} = \frac{\left(1 - \frac{\text{Similarity Score}}{2}\right) + \text{Normalized Impact Severity Score} + \text{Fingerprint affinity Score}}{3} \qquad \text{EQN. 6}$$

where the similarity score is the similarity score as determined above in EQN. 4, the fingerprint affinity score is the fingerprint score as defined above in EQN. 5, and the normalized value of the impact severity score. The impact severity score is defined by an arbitrary attack kill chain of choice, with the impact severity measured from 1 to n where 1 represents the lowest severity and n represents the highest severity. For example, scheduled task creation can be tied to persistence and the making of DNS requests can be tied to discovery. Discovery related behaviors can have relatively less impact on a victim environment as compared to persistence related behaviors. As such, assuming all things constant, an executable showing a behavior difference in terms of scheduled task creation will have a higher risk score as compared to an executable showing a behavior difference in terms of making DNS requests. For calculating the final risk score, the impact severity score can be normalized to be in the range of 0 to 1, e.g., to ensure that the scores are within a similar numerical range such that no one score overwhelmingly impacts the final risk score. The impact severity score can be normalized as shown below in EQN. 7:

$$\text{Normalized Impact Severity Score} = \frac{\text{Impact Severity Score} - 1}{n - 1} \qquad \text{EQN. 7}$$

The output of the executable prioritizer 160 (e.g., a list of executables prioritized by final risk score) can be compared against a risk score threshold (e.g., as input by a user). Executables that exceed the threshold can be input to one or more technological systems. Turning to FIG. 1C, FIG. 1C shows a case management system 165, an endpoint detection and protection platform 170, a vulnerability management system 175, and enhanced monitoring system 180. The case management system 165 can transmit alerts and/or messages regarding the high-risk executables to security teams. The endpoint detection and protection platform 170 can automatically block high risk executables from executing. The vulnerability management system 175 can initiate patches (e.g., based on the particular hash) for high-risk executables. The hash of the high risk executable can be tasked for enhanced monitoring. For example, an alert or additional context can be automatically generated when a user/endpoint which has been observed to run the executable triggered one or more predefined alerts. These predefined alerts can refer to a set of Sigma, Python and/or YARA rules that can be used to identify suspicious activity within the environment.

In this manner, one or several systems can take automated actions based on the output of the executable prioritizer module 160.

In some enterprise systems having thousands of hosts (e.g., 10 k, 100 k, 200 k, etc.), the number of unique processes for a system having hundreds of thousands of hosts can be in the order of two billion a day and more than twenty billion event logs. In systems of this scale there can be approximately 1,200,000 unique hashes. Creating bit vector representations for behaviors can reduce the complexity of computation time, the number of computations performed and/or improve overall speed and functionality.

Figure 7A:
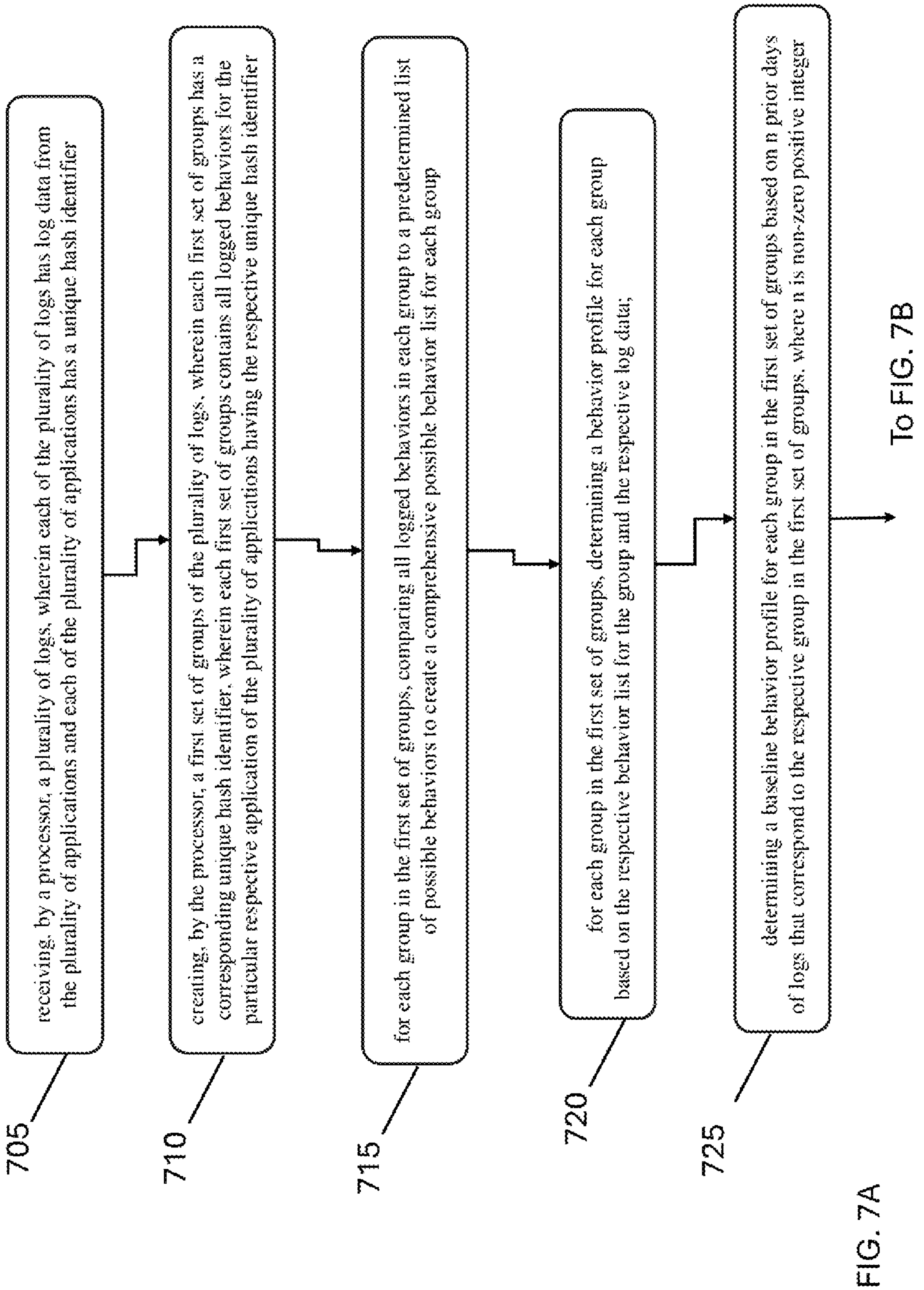
FIGS. 7A and 7B show a method for threat detection on an executable by executable basis in an enterprise system having a plurality of applications, according to some embodiments.
Figure 7B:
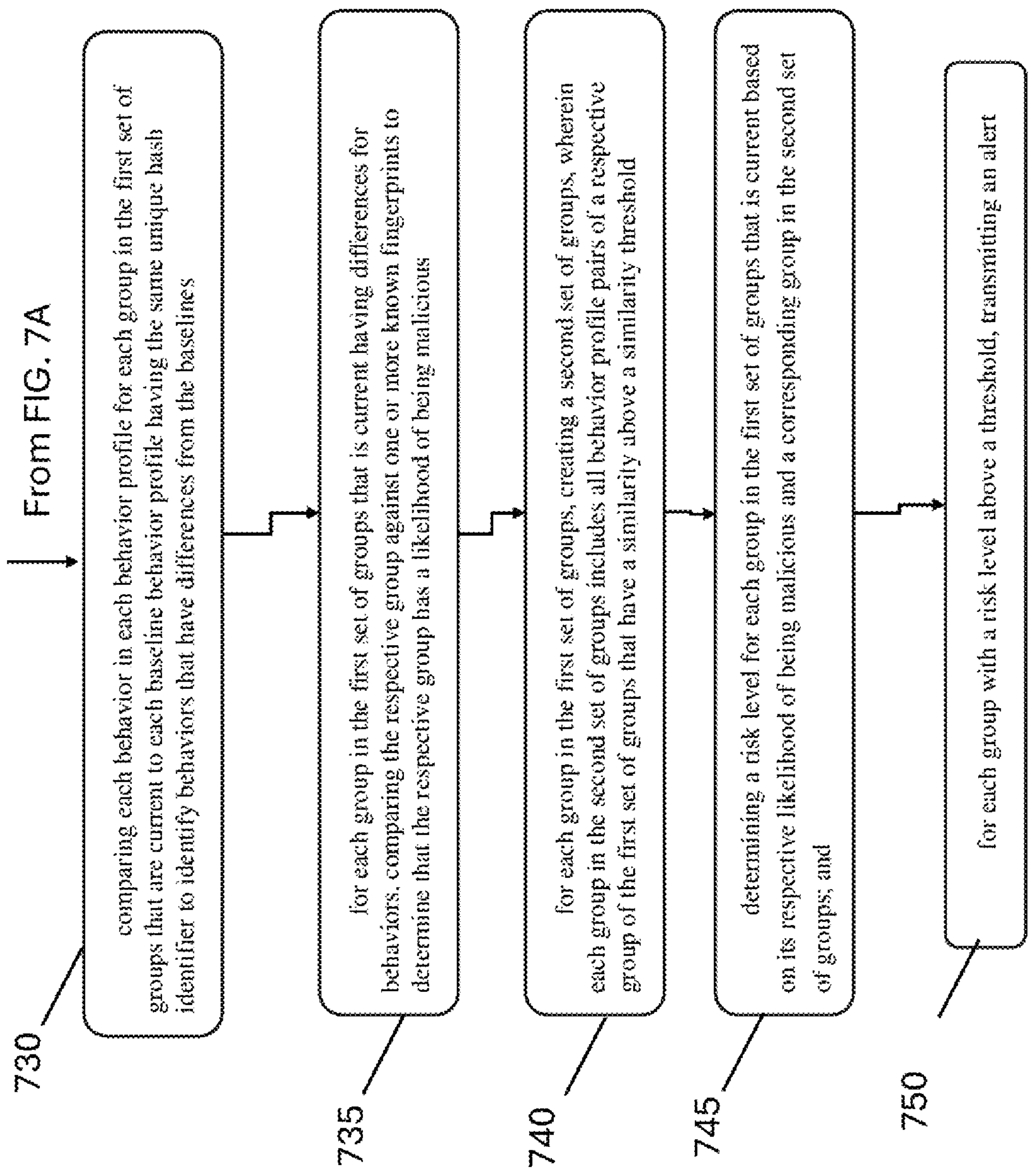

FIGS. 7A and 7B show a method for threat detection on an executable by executable basis in an enterprise system having a plurality of applications, according to some embodiments.

The method can involve receiving, by a processor (e.g. log collection agent 125 as described above in FIG. 1A), a plurality of logs, wherein each of the plurality of logs has log data from the plurality of applications and each of the plurality of applications has a unique hash identifier (Step 705).

The method can also involve creating, by the processor, a first set of groups of the plurality of logs, wherein each first set of groups has a corresponding unique hash identifier, wherein each first set of groups contains all logged behaviors for the particular respective executable of the plurality of applications having the respective unique hash identifier (Step 710).

The method can also involve for each group in the first set of groups, comparing all logged behaviors in each group to a predetermined list of possible behaviors to create a comprehensive possible behavior list for each group (e.g., table 210 and 220 as shown above in FIG. 2) (Step 715)

The method can also involve for each group in the first set of groups, determining a behavior profile for each group based on the respective behavior list for the group and the respective log data (e.g., table 230 as shown above in FIG. 2) (Step 720).

The method can also involve determining a baseline profile for each group in the first set of groups based on n prior days of logs that correspond to the respective group in the first set of groups, where n is a non-zero positive integer (e.g., as shown above and described above with respect to FIG. 4) (Step 725)

The method can also involve comparing each behavior in each behavior profile for each group in the first set of groups that are current to each baseline behavior profile having the same unique hash identifier to identify behaviors that have differences from the baselines (e.g., as described above with respect to FIGS. 5A and 5B) (Step 730).

The method can also involve for each group in the first set of groups that is current having differences for behaviors, comparing the differences of the respective group against one or more known fingerprints to determine whether the respective group has a likelihood of being malicious (e.g., as shown above in FIG. 6) (Step 735).

The method can also involve for each group in the first set of groups, creating a second set of groups, wherein each group in the second set of groups includes all behavior profile pairs of a respective group of the first set of groups that have a similarity above a similarity threshold (e.g., as described above with respect to FIG. 3) (Step 740).

The method can also involve determining a risk level (e.g., final risk score as described above) for each group in the first set of groups that is current based on its respective likelihood of being malicious and a corresponding group in the second set of groups (Step 745).

The method can also involve for each group with a risk level above a threshold, transmitting an alert (e.g., as described above with respect to FIG. 1C. Step 750).

The claimed invention addresses a computer-centric technical problem arising in enterprise computing environments-namely, the inability of typical conventional computer systems to efficiently and/or accurately identify executable specific security risks in the face of a plurality of logs generated across large numbers of hosts. The claims recite, in part, "receiving, by a processor, a plurality of logs" and "creating, by the processor, a first set of groups of the plurality of logs, wherein each first set of groups has a corresponding unique hash identifier," which can structurally reorganize machine-generated log data around executable hash identifiers, rather than users or hosts as is typically done in the prior art. Structurally reorganizing around hash identifiers can produce executable-level processing that is not achievable using conventional security architectures. Executable-level processing improves computer functionality by modeling and evaluating security behavior at the level at which code is actually executed by the operating system, which can result in more accurate baselining, reduced computational complexity, and detection capabilities that cannot be achieved through higher-level abstractions such as users, hosts, or applications.

The claims recite "determining a behavior profile for each group based on the respective behavior list for the group and the respective log data" and "determining a baseline behavior profile for each group . . . based on n prior days of logs," which can result in a machine-readable representation of executable behavior that can materially reduce storage overhead, and computational complexity.

The claims recite "comparing each behavior in each behavior profile . . . to each baseline behavior profile . . . to identify behaviors that have differences from the baselines" which can effect a concrete transformation of raw log data into executable specific behavioral deviations. These steps can improve how the computer system stores, organizes, and processes security telemetry.

The claims recite "comparing the differences observed for each respective group against one or more known fingerprints to determine that the respective group has a likelihood of being malicious" This comparison can be performed on machine-generated behavioral differences rather than on static identifiers or manual rules, which can enable detection of complex, multi-behavior patterns that cannot be reliably identified using conventional techniques.

The claims also recite "creating a second set of groups . . . that have a similarity above a similarity threshold," which clusters executables based on quantified behavioral similarity rather than superficial binary attributes, thereby improving resilience to evasion techniques such as binary modification.

The claims recite "determining a risk level for each group . . . based on its respective likelihood of being malicious and a corresponding group in the second set of groups" which can provide a computational mechanism for prioritizing machine resources and security responses.

The claims recite "for each group with a risk level above a threshold, transmitting an alert" which can limit downstream system activity to high-risk executables, reducing unnecessary processing and alert volume.

Figure 8:
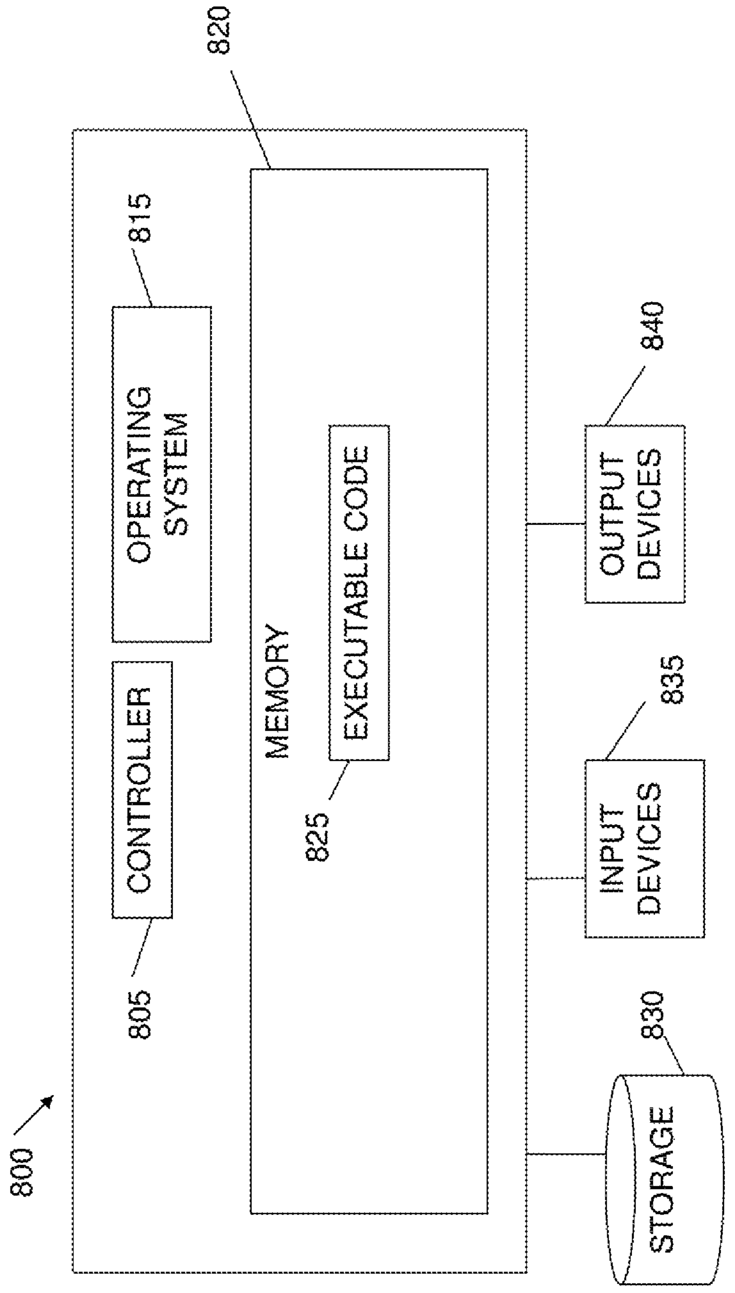
FIG. 8 shows a block diagram of a computing device 800 which can be used with embodiments of the invention.

FIG. 8 shows a block diagram of a computing device 800 which can be used with embodiments of the invention. Computing device 800 can include a controller or processor 805 that can be or include, for example, one or more central processing unit processor(s) (CPU), one or more Graphics Processing Unit(s) (GPU or GPGPU), a chip or any suitable computing or computational device, an operating system 815, a memory 820, a storage 830, input devices 835 and output devices 840.

Operating system 815 can be or can include any code segment designed and/or configured to perform tasks involving coordination, scheduling, arbitration, supervising, controlling or otherwise managing operation of computing device 800, for example, scheduling execution of programs. Memory 820 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 820 can be or can include a plurality of, possibly different memory units. Memory 820 can store for example, instructions to carry out a method (e.g. code 825), and/or data such as user responses, interruptions, etc.

Executable code 825 can be any executable code, e.g., an application, a program, a process, task or script. Executable code 825 can be executed by controller 805 possibly under control of operating system 815. For example, executable code 825 can when executed cause masking of personally identifiable information (PII), according to embodiments of the invention. In some embodiments, more than one computing device 800 or components of device 800 can be used for multiple functions described herein. For the various modules and functions described herein, one or more computing devices 800 or components of computing device 800 can be used. Devices that include components similar or different to those included in computing device 800 can be used, and can be connected to a network and used as a system. One or more processor(s) 805 can be configured to carry out embodiments of the invention by for example executing software or code. Storage 830 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 830 and can be loaded from storage 830 into a memory 820 where it can be processed by controller 805. In some embodiments, some of the components shown in FIG. 8 can be omitted.

Input devices 835 can be or can include for example a mouse, a keyboard, a touch screen or pad or any suitable input device. It will be recognized that any suitable number of input devices can be operatively connected to computing device 800 as shown by block 835. Output devices 840 can include one or more displays, speakers and/or any other suitable output devices. It will be recognized that any suitable number of output devices can be operatively connected to computing device 800 as shown by block 840. Any applicable input/output (I/O) devices can be connected to computing device 800, for example, a wired or wireless network interface card (NIC), a modem, printer or facsimile machine, a universal serial bus (USB) device or external hard drive can be included in input devices 835 and/or output devices 840.

Embodiments of the invention can include one or more article(s) (e.g. memory 820 or storage 830) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, “processing,” “computing,” “calculating,” “determining,” “establishing”, “analyzing”, “checking”, or the like, can refer to operation(s) and/or process(es) of a computer, a computing platform, a computing system, or other electronic computing device, that manipulates and/or transforms data represented as physical (e.g., electronic) quantities within the computer’s registers and/or memories into other data similarly represented as physical quantities within the computer’s registers and/or memories or other information non-transitory storage medium that can store instructions to perform operations and/or processes.

Although embodiments of the invention are not limited in this regard, the terms “plurality” and “a plurality” as used herein can include, for example, “multiple” or “two or more”. The terms “plurality” or “a plurality” can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. A method for threat detection on an application by application basis in an enterprise system having a plurality of applications, the method comprising:

receiving, by a processor, a plurality of logs, wherein each of the plurality of logs has log data from the plurality of applications and each of the plurality of applications has a unique hash identifier;

creating, by the processor, a first set of groups of the plurality of logs, wherein each group in the first set of groups has a corresponding unique hash identifier, wherein each group in the first set of groups contains all logged behaviors for the particular respective application of the plurality of applications having the respective unique hash identifier;

for each group in the first set of groups, comparing, by the processor, all logged behaviors in each group to a predetermined list of possible behaviors to create a comprehensive possible behavior list for each group;

for each group in the first set of groups, determining, by the processor, a behavior profile for each group based on the respective behavior list for the group and the respective log data;

determining, by the processor, a baseline behavior profile for each group in the first set of groups based on n prior days of logs that correspond to the respective group in the first set of groups, where n is non-zero positive integer;

comparing, by the processor, each behavior in each behavior profile for each group in the first set of groups that are current to each baseline behavior profile having the same unique hash identifier to identify behaviors that have differences from the baselines;

for each group in the first set of groups that is current having differences for behaviors, comparing, by the processor, the differences observed for each respective group against one or more known fingerprints to determine that the respective group has a likelihood of being malicious;

for each group in the first set of groups, creating, by the processor, a second set of groups, wherein each group in the second set of groups includes all behavior profile pairs of a respective group of the first set of groups that have a similarity above a similarity threshold;

determining, by the processor, a risk level for each group in the first set of groups that is current based on its respective likelihood of being malicious and a corresponding group in the second set of groups; and for each group with a risk level above a threshold, transmitting, by the processor, an alert.

2. The method of claim 1 wherein each behavior profile is a binary vector.

3. The method of claim 1 wherein the predetermined list of possible behaviors is updated in real-time.

4. The method of claim 1 wherein the similarity is determined by using a Jaccard Index on all unique pairs of the behavior profiles.

5. The method of claim 1 wherein each baseline behavior profile is based on historical data n number of prior days, where n is any non-zero integer.

6. The method of claim 5 wherein each baseline behavior profile is based on a most prevalent bit that appears more than fifty percent of the time for each particular behavior in the profile over the n number of prior days.

7. The method of claim 5 wherein n is a rolling window.

8. The method of claim 5 wherein the historical data is updated daily.

9. The method of claim 1 wherein a behavior profile for a group is current if it was created in a prior twenty four hours.

10. The method of claim 1 wherein generating the behavior profile further comprises inferring data from the respective logs.

11. A system for threat detection on an application by application basis in an enterprise system, comprising:

plurality of applications;

a hardware processor coupled to the plurality of applications, the hardware processor configured to:

receive a plurality of logs, wherein each of the plurality of logs has log data from the plurality of applications and each of the plurality of applications has a unique hash identifier;

create a first set of groups of the plurality of logs, wherein each group in the first set of groups has a corresponding unique hash identifier, wherein each group in the first set of groups contains all logged behaviors for the particular respective application of the plurality of applications having the respective unique hash identifier;

for each group in the first set of groups, compare all logged behaviors in each group to a predetermined list of possible behaviors to create a comprehensive possible behavior list for each group;

for each group in the first set of groups, determine a behavior profile for each group based on the respective behavior list for the group and the respective log data;

determine a baseline behavior profile for each group in the first set of groups based on n prior days of logs that correspond to the respective group in the first set of groups, where n is non-zero positive integer;

compare each behavior in each behavior profile for each group in the first set of groups that are current to each baseline behavior profile having the same unique hash identifier to identify behaviors that have differences from the baselines;

for each group in the first set of groups that is current having differences for behaviors, compare the differences observed for each respective group against one or more known fingerprints to determine that the respective group has a likelihood of being malicious;

for each group in the first set of groups, create a second set of groups, wherein each group in the second set of groups includes all behavior profile pairs of a respective group of the first set of groups that have a similarity above a similarity threshold;

determine a risk level for each group in the first set of groups that is current based on its respective likelihood of being malicious and a corresponding group in the second set of groups; and for each group with a risk level above a threshold, transmitting an alert.

12. The system of claim 11 wherein each behavior profile is a binary vector.

13. The system of claim 11 wherein the predetermined list of possible behaviors is updated in real-time.

14. The system of claim 11 wherein the similarity is determined by using a Jaccard Index on all unique pairs of the behavior profiles.

15. The system of claim 11 wherein each baseline behavior profile is based on historical data n number of prior days, where n is any non-zero integer.

16. The system of claim 15 wherein each baseline behavior profile is based on a most prevalent bit that appears more than fifty percent of the time for each particular behavior in the profile over the n number of prior days.

17. The system of claim 15 wherein n is a rolling window.

18. The system of claim 15 wherein the historical data is updated daily.

19. The system of claim 11 wherein a behavior profile for a group is current if it was created in a prior twenty four hours.

20. The system of claim 11 wherein generating the behavior profile further comprises inferring data from the respective logs.

* * * * *